United States Patent
O'Brien et al.

(10) Patent No.: US 7,817,363 B2
(45) Date of Patent: Oct. 19, 2010

(54) SINGLE-PASS DEFECT DETECTION FOR HARD-DISK DRIVE SYSTEMS

(75) Inventors: Keenan T. O'Brien, Longmont, CO (US); Richard Rauschmayer, Longmont, CO (US)

(73) Assignee: Agere Systems Inc., Allentown, PA (US)

( * ) Notice: Subject to any disclaimer, the term of this patent is extended or adjusted under 35 U.S.C. 154(b) by 170 days.

(21) Appl. No.: 12/272,255

(22) Filed: Nov. 17, 2008

(65) Prior Publication Data

US 2010/0123962 A1    May 20, 2010

(51) Int. Cl.
    *G11B 27/36* (2006.01)
(52) U.S. Cl. .................................. 360/31; 360/25
(58) Field of Classification Search .................. None
    See application file for complete search history.

(56) References Cited

U.S. PATENT DOCUMENTS

| | | | | |
|---|---|---|---|---|
| 4,656,532 A * | 4/1987 | Greenberg et al. | ............ | 360/48 |
| 5,031,054 A * | 7/1991 | Lewis | .......................... | 360/31 |
| 5,844,920 A * | 12/1998 | Zook et al. | .................. | 714/769 |
| 6,353,315 B1 * | 3/2002 | Egan et al. | ................... | 324/212 |
| 2004/0047258 A1 * | 3/2004 | Pan et al. | ................. | 369/53.15 |
| 2009/0034109 A1 * | 2/2009 | Paul et al. | ..................... | 360/53 |

* cited by examiner

*Primary Examiner*—Jason C Olson
(74) *Attorney, Agent, or Firm*—Mendelsohn, Drucker & Associates, P.C.; Craig M. Brown; Steve Mendelsohn

(57) ABSTRACT

In one embodiment, defects are detected on the face of a hard-disk drive platter. A preamble, a sync mark, user or pseudorandom data, and a data pad are written to every sector on a track of the platter. Inter-sector gaps that separate consecutive sectors are overwritten with a fixed data pattern such that consecutive sectors are in phase lock with one another. After the track has been written, the track is read back and analyzed. Consecutive sectors are analyzed continuously without stopping. The preambles, sync marks, data pads, and overwritten inter-sector gaps are analyzed using suitable flaw-scan techniques. The user or pseudorandom data is analyzed using both data-integrity checks and suitable flaw-scan techniques. This process is repeated for all tracks on the disk, and defect detection is completed when all tracks have been analyzed.

22 Claims, 10 Drawing Sheets

SINGLE-PASS DEFECT DETECTION FOR HARD-DISK DRIVE SYSTEMS

BACKGROUND OF THE INVENTION

1. Field of the Invention

The present invention relates to hard-disk drive systems, and, in particular, to detecting defects on the surface of hard-disk drive platters.

2. Description of the Related Art

FIG. 1 shows a simplified block diagram of a prior-art hard-disk drive (HDD) system 100. HDD system 100 has hard-drive (HD) controller 104, which manages a number of functions of HDD system 100. One function is handling the transfer of data to and from HDD system 100 during read and write operations. During write operations, incoming digital data is received from external hardware through a user interface 102, such as a SATA (serial advanced technology attachment) or IDE (integrated or intelligent drive electronics) interface. The incoming data is stored in queues in HD controller 104 and scheduled for write operations. After a write operation is scheduled, the incoming data is provided to recording channel 108 via non-return-to-zero (NRZ) bus 106, and HD controller 104 directs recording channel 108 to begin the writing operation.

The incoming data is encoded by recording channel 108 and converted from digital to analog format to generate an analog signal. Encoding may be performed using, for example, run-length limited (RLL) encoding techniques, error-correction encoding techniques such as low-density parity-check (LDPC) encoding or Reed Solomon encoding, a combination of the above, or other suitable techniques for encoding data that is to be written to an HD platter. Recording channel 108 then directs preamplifier 112 to enter into a writing mode using one or more control signals 110 that are transmitted directly between recording channel 108 and preamplifier 112. Alternatively, HD controller 104 could direct preamplifier AD to enter into the writing mode. Preamplifier 112 amplifies the analog signal such that the resulting amplified signal has sufficient power to drive write head 118. Write head 118 is typically constructed with an inductive element that produces a magnetic field when powered. The magnetic field, which varies with the amplified signal level (e.g., high or low), writes data to platter 124 by altering a magnetic recording material that is coated on the face of platter 124. Typically, platter 124 is partitioned into concentric rings called tracks, and each track is further partitioned into smaller sections called sectors. The incoming data is written to the sectors, each of which holds a specified amount of data (e.g., 512 bytes). Although only one platter is shown in FIG. 1, conventional HDD systems may have more than one platter and each additional platter may be served by additional write and read heads.

During read operations, HD controller 104 (i) receives a request for data from external hardware through user interface 102 and (ii) directs recording channel 108 to begin read operations. Recording channel 108 in turn directs preamplifier 112 to enter into a reading mode using the one or more control signals 110 that are transmitted directly to preamplifier 112. Preamplifier 112 provides a bias current to read head 120, which reads data from the sectors on platter 124. Read head 120 is typically constructed with a magneto resistive (MR) element having resistive properties that change as the magnetic field of platter 124 changes. As the resistive properties of the MR element change, a corresponding change in voltage is recorded as a reproduced, or playback, analog data signal. The outgoing analog data signal is then amplified by preamplifier 112 and provided to recording channel 108.

Recording channel 108 (i) converts the outgoing analog data signal from analog to digital format, (ii) filters the outgoing digital signal, and (iii) decodes the outgoing digital signal. Decoding may be performed using, for example, RLL decoding, partial-response maximum-likelihood (PRML) decoding, Viterbi decoding, and error-correction decoding techniques such as Reed Solomon decoding or LDPC decoding, or a combination of the above methods. The decoded data is then provided to HD controller 104 via NRZ bus 106 for transfer to external hardware through user interface 102.

Another function of HD controller 104 is the radial positioning of write head 118 and read head 120 relative to platter 124. Servo data on platter 124 (i.e., positioning data that is prerecorded on and subsequently read from platter 124) is used to determine the location of write head 118 and read head 120 over platter 124. This data is interpreted by HD controller 104, which generates and provides positioning commands to motor controller 126. Motor controller 126 drives spindle motor 128, which maintains a desired (e.g., constant) rotation speed of platter 124 about its axis. Motor controller 126 also drives voice coil motor (VCM) 114, which positions write head 118 and read head 120 radially over platter 124. Write head 118 and read head 120 are typically separate components that are fabricated together on a head assembly 122, which is attached to VCM 114 via a single positioning arm 116.

During the manufacturing process, a number of defects may arise in the magnetic recording material on platter 124. When a user writes data to or reads data from defective areas on platter 124, errors may arise in storing or recovering the data. To minimize the likelihood of these errors, HDD system manufacturers typically flag defects during the manufacturing process. Flagged defects that negatively affect reading and writing operations are removed from the final usable storage space of the HDD system by placing the defect locations in a table. During subsequent read and write operations, the HDD system references this table to avoid using the defective locations.

Determining which defects merit mapping out of the final usable space is a balancing act. On one hand, mapping too few areas of the platter out of the final usable storage space could result in reliability issues. If sufficient areas are not mapped out, then the manufacturer will incur costs and other problems due to failing HDD systems. On the other hand, mapping too many areas of the platter out of the final usable storage space could result in yield problems. In such a case, the intended capacity of the HDD system might not be achievable.

Traditionally, HDD system manufacturers have employed a prior-art two-pass method to detect defects on the face of a platter. The first pass is performed using a non-final disk formatting and the second pass is performed using a subsequent (and possibly final) disk formatting. In general, the first defect-detection pass is performed by writing a fixed data pattern to a track on the disk. The track is then read back and the recovered (i.e., outgoing) signal is analyzed for defects using traditional flaw-scan techniques (as described below). Relatively major defects are flagged and mapped out of the final usable space of the HDD system. Defects that are marginal (i.e., not relatively major and not relatively minor) are flagged and mapped to the subsequent drive formatting so that they may be tracked during the second pass or processed differently with other techniques. This process is repeated for all tracks on the platter, and the first pass is completed once all tracks have been analyzed.

The second defect-detection pass is performed by writing a real user data pattern to a track on the platter. Prior to writing the user data pattern, the data is encoded by the recording channel using, for example, run-length limited (RLL) encoding techniques, error-correction encoding techniques such as low-density parity-check (LDPC) encoding or Reed Solomon encoding, a combination of the above methods, and/or other suitable techniques for encoding data that is to be written to an HD platter. The track is then read back and a data-integrity check is performed by decoding the encoded user data pattern to recover the original user data pattern. Portions of the user data pattern that may be properly decoded are maintained in the final usable space, while portions of the user data pattern that cannot be properly decoded are flagged as defective. To further understand the prior-art two-pass defect-detection method, consider FIGS. 2-7.

FIG. 2 shows a simplified representation of one section 200 of a track on a HDD platter having a non-final disk formatting. This non-final disk formatting is typically used for the first pass of the prior-art two-pass defect-detection method. As shown, section 200 is partitioned into several areas. These areas, which are not actually marked on the face of the disk, are each mapped to one of three types of fields: a fixed-pattern field, an inter-sector gap, or a servo field. Each fixed-pattern field is reserved for writing a fixed data pattern during the first defect-detection pass. Each servo field is reserved for storing servo (i.e., positioning) data. Typically, the servo data is written at the time of the non-final formatting or sometime prior to the start of the first defect-detection pass. Each inter-sector gap serves as a buffer between two other types of fields, such as between a servo field and a fixed-pattern field. These gaps are not intended for writing data; however, at times, data may be inadvertently written over the inter-sector gaps due to, for example, the effects of jitter.

As shown in FIG. 2, section 200 is formatted to have two fixed-pattern fields 206-1 and 206-2, four inter-sector gaps 204-1, 204-2, 204-3, and 204-4, and three servo fields 202-1, 202-2, and 202-3. First fixed-pattern field 206-1 is flanked by first and second inter-sector gaps 204-1 and 204-2, and second fixed-pattern field 206-2 is flanked by third and fourth inter-sector gaps 204-3 and 204-4. First inter-sector gap 204-1 serves as a buffer between first servo field 202-1 and first fixed-pattern field 206-1, second inter-sector gap 204-2 serves as a buffer between first fixed-pattern field 206-1 and second servo field 202-2, third inter-sector gap 204-3 serves as a buffer between second servo field 202-2 and second fixed-pattern field 206-2, and fourth inter-sector gap 204-4 serves as a buffer between second fixed-pattern field 206-2 and third servo field 202-3. This formatting is repeated for the remainder of the track on which section 200 resides and is similar throughout the remainder of platter 124 (i.e., the remaining tracks). Tracks that are located closer to the center of platter 124 than section 200 may have smaller fixed-pattern fields due to their smaller circumferences, while tracks located farther from the center of platter 124 than section 200 may have larger fixed-pattern fields due to their larger circumferences.

FIG. 3 graphically illustrates a prior-art sequence 300 for writing a fixed data pattern to first fixed-pattern field 206-1 of section 200 shown in FIG. 2. At time $t_1$, HD controller 104 enables the servo mode and performs a servo operation from times $t_1$ to $t_2$ to locate first servo field 202-1. After the servo mode is disabled at time $t_2$, HD controller 104 of FIG. 1 directs recording channel 108 to enable the write mode at time $t_3$. The relatively brief delay from times $t_2$ to $t_3$ corresponds to write head 118 passing over inter-sector gap 204-1 without writing the fixed data pattern. As shown in close-up 302, once the write mode is enabled at time $t_3$, writing of the fixed data pattern to platter 124 may be further delayed until time $t_{3a}$ due to a delay in powering up pre-amplifier 112. The powering up of preamplifier 112 may be timed such that write head 118 begins writing the fixed data pattern as soon as inter-sector gap 204-1 has passed.

The write mode is asserted until time $t_4$, and during this time, the fixed data pattern is written to first fixed-pattern field 206-1. The fixed data pattern, which may be generated by recording channel 108, does not pass through the normal encoding path of recording channel 108 before it is written (e.g., the fixed data pattern doesn't undergo encoding such as error-correction encoding and RLL encoding). The fixed data pattern may be a non-return-to-zero (NRZ) data pattern, such as an iT data pattern that alternates every i bits, where i is an integer. For example, a 2T pattern (i.e., i=2), having a pattern that alternates every two bits (i.e., 11001100 . . . ), is often used.

As shown in close-up 304 of FIG. 3, once the writing mode is disabled at time $t_4$, writing of the fixed data pattern to platter 124 may continue for a relatively brief period of time until writing of the fixed data pattern is completed (i.e., at time $t_{4a}$). Termination of the write mode may be planned such that the writing of the fixed data pattern is completed in time to leave inter-sector gap 204-2 between first fixed-pattern field 206-1 and second servo field 202-2. At time $t_5$, the servo mode is again enabled and a servo operation is performed to locate the next fixed-pattern field for writing (e.g., second fixed-pattern field 206-2). The writing process described above is repeated for the next fixed-pattern field, and then is subsequently repeated for the remainder of the track in which section 200 resides. After the entire track has been written, the track is read back in a clockwise direction and analyzed by recording channel 108.

FIG. 4 graphically illustrates a prior-art sequence 400 for reading a fixed data pattern from first fixed-pattern field 206-1 of section 200 shown in FIG. 2. At time $t_1$, HD controller 104 enables the servo mode and performs a servo operation from times $t_1$ to $t_2$ to locate first servo field 202-1 corresponding to fixed-pattern field 206-1. After the servo mode is disabled, the read mode is enabled at time $t_3$. The relatively brief delay from times $t_2$ to $t_3$ corresponds to read head 120 passing over inter-sector gap 204-1 without reading the gap. Since inter-sector gap 204-1 is not read, it is also not analyzed for defects. Once the read mode is enabled, there is a lock period 208-1, as shown in close-up 402, in which recording channel 108 performs a zero-phase start, timing acquisition, and gain acquisition to lock on the fixed data pattern written to fixed-pattern field 206-1. During lock period 208-1, the defect-detection capabilities of recording channel 108 are limited, and thus, defect detection is not as effective during lock period 208-1 as it is after recording channel 108 has locked on the fixed data pattern.

Optimally, recording channel 108 would begin acquiring the lock at the beginning of the fixed data pattern. However, as shown in close-up 402 of FIG. 4, the read mode might not be enabled until after the beginning of the fixed data pattern has actually passed (i.e., read mode might be enabled at time $t_3$ as opposed to time $t_{2a}$). This relatively short delay between the beginning of the fixed data pattern and the assertion of the read mode may be introduced to ensure that recording channel 108 does not inadvertently attempt to perform the lock over inter-sector gap 204-1. In the event of such a delay, the portion of the fixed data pattern passed over from times $t_{2a}$ to $t_3$ will not be read, and consequently, will not be analyzed for defects.

Once recording channel 108 has obtained a lock on the fixed data pattern in first fixed-pattern field 206-1, the fixed data pattern is read back and analyzed. When a 2T pattern has been written to platter 124, the recovered (i.e., outgoing) signal generally forms a sine wave. In analyzing the recovered signal, recording channel 108 does not process the signal through the normal decoding path of recording channel 108. In other words, recording channel 108 does not process the recovered signal using decoding such as error-correction decoding, PRML decoding, RLL decoding, or other typical decoding because the fixed data pattern was not encoded during the write operation. Note, however, that the recovered signal may still be processed using a Viterbi detector.

Recording channel 108 may analyze the recovered signal using any of a number of traditional flaw-scan techniques that exploit the recording channel's knowledge of the repetitive pattern. These flaw-scan techniques, which are typically performed after the recovered signal has been converted from analog-to-digital format, may include, for example, looking for distortions in the recovered signal (i) by cross-correlating the recovered signal with the expected signal, (ii) by verifying that the peaks of the recovered signal are in the proper position, and (iii) by comparing the peaks of the recovered signal to a threshold. If the peaks are not in the proper position or are below the threshold, then the area is flagged as defective. Further, the log-likelihood ratios that are generated by a Soft Output Viterbi detector or other soft detector may be used as potential flags for defective areas. Relatively long regions of defects in the recovered signal are flagged and may be mapped out of the usable disk space altogether. Areas of defects that are marginal (i.e., not relatively major and not relatively minor) are flagged and mapped to the subsequent (and possibly final) drive formatting so that they may be appropriately processed during the second defect-detection pass described below or may be more thoroughly examined by other defect detection methods. As an example, FIG. 2 shows the location of three exemplary marginal defects 210-1, 210-2, and 210-3 flagged on section 200 relative to the non-final formatting. First and second defects 210-1 and 210-2 are located in first fixed-pattern field 206-1 and third defect 210-3 is located in second fixed-pattern field 206-2.

Referring again to FIG. 4, the reading mode is disabled at time $t_4$, which, as shown in close-up 404, corresponds to the end of the fixed data pattern and to the beginning of inter-sector gap 204-2. Note that inter-sector gap 204-2 does not contain the fixed data pattern, and consequently, this gap is neither read nor analyzed for defects. At time $t_5$, the servo mode is enabled, and a servo operation is performed to locate the next fixed-pattern field to analyze for defects (e.g., second fixed-pattern field 206-2). The reading operation described above is repeated for the next fixed-pattern field, and then is subsequently repeated for the remainder of the track in which section 200 resides. After the full track has been analyzed, the writing and reading operations of the first defect-detection pass are repeated on a track-by-track basis for the remaining tracks on platter 124. The first defect-detection pass is completed once all tracks on platter 124 have been analyzed for defects. After the first pass is completed, platter 124 is formatted using a subsequent formatting, and the second defect-detection pass is performed using the subsequent formatting.

FIG. 5 shows a simplified representation of a subsequent disk formatting on the same section 200 of a track shown in FIG. 2. This subsequent formatting is typically the final formatting that is used by a consumer to write and read data. As shown, servo fields 202-1, 202-2, and 202-3 and the inter-sector gaps 204-1, 204-2, 204-3, and 204-4 remain unchanged from the non-final formatting of FIG. 2. Fixed-pattern fields 206-1 and 206-2 on the other hand are partitioned into a number of sectors (i.e., sectors 212-1, . . . , 212-5), which are separated from one another by inter-sector gaps (i.e., inter-sector gaps 204-5, . . . , 204-8). Generally, each sector comprises, from left to right, a preamble field, a sync-mark field, a user-data field, and a data-pad field. The user-data field is reserved for writing a fixed amount of actual user data, such as 512 bytes, and is framed by a sync-mark field and a data-pad field. The sync-mark field is reserved for writing a sync mark, which is used by recording channel 108 to determine the beginning of actual user data. The data-pad field is reserved for writing a data pad, which is used by recording channel 108 to close out detection of the user data. The preamble field, which precedes the sync-mark field, is reserved for writing preamble data, which is used by recording channel 108 to perform zero-phase starts, timing acquisition, and gain acquisition to lock on the user data stored on the corresponding sector. The preamble data, sync mark, and data pad are written each time that user data is written to a particular sector or a fragment of a sector.

As shown in FIG. 5, first fixed-pattern field 206-1 of FIG. 2, is partitioned into two full sectors 212-1 and 212-2, a first half of sector 212-3, and two inter-sector gaps 204-5 and 204-6. First full sector 212-1 is flanked by inter-sector gaps 204-1 and 204-5, second full sector 212-2 is flanked by inter-sector gaps 204-5 and 204-6, and the first half of sector 212-3 is flanked by inter-sector gaps 204-6 and 204-2. Note that, while the first half of sector 212-3 is not a full sector, it still has a preamble field, sync-mark field, user-data field, and data-pad field. Second fixed-pattern field 206-1 of FIG. 2 is similarly partitioned into a second half of sector 212-3, two full sectors 212-4 and 212-5, and two inter-sector gaps 204-7 and 204-8. The second half of sector 212-3 is flanked by inter-sector gaps 204-3 and 204-7, fourth sector 212-4 is flanked by inter-sector gaps 204-7 and 204-8, and fifth sector 212-5 is flanked by inter-sector gaps 204-8 and 204-4. Similar to the first half of sector 212-3, the second half of sector 212-3 has a preamble field, sync-mark field, user-data field, and data-pad field. This formatting is repeated for the remainder of the track on which section 200 resides and is similar throughout the remainder of platter 124 (i.e., the remaining tracks). Tracks that are located closer to the center of platter 124 than section 200 may have smaller numbers of sectors due to their smaller circumferences, while tracks located farther from the center of platter 124 than section 200 may have larger numbers of sectors due to their larger circumferences. Further, depending on their circumferences, some tracks might not have sectors such as sector 212-3 that are split by a servo field.

FIG. 5 also shows the location of the three exemplary marginal defects of FIG. 2, relative to the subsequent drive formatting. First defect 210-1 is located in the sync-mark field of sector 212-2, second defect 210-2 is located in the user-data field of the first half of sector 212-3, and third defect 210-3 is located in the user-data field of sector 212-4. These defects may be tracked during the second defect-detection pass to determine whether they warrant being mapped out of the final usable storage space of platter 124.

FIG. 6 graphically illustrates a prior-art sequence 600 for writing a user data pattern to the first two and one-half sectors of section 200 shown in FIG. 5. At time $t_1$, HD controller 104 enables the servo mode and performs a servo operation from times $t_1$ to $t_2$ to locate first servo field 202-1. After the servo mode is disabled, the write mode is enabled at time $t_3$. The relatively brief delay from times $t_2$ to $t_3$ corresponds to write head 118 passing over inter-sector gap 204-1 without writing the user data pattern to the gap. Once the write mode is enabled, writing may be further delayed due to a delay in powering up preamplifier 112. Thus, as shown in close-up 602, although write mode is enabled at time $t_3$, write head 118 might not begin writing the preamble until time $t_{3a}$. The powering up of preamplifier 112 may be timed such that write head 118 begins writing the preamble as soon as inter-sector gap 204-1 has passed.

Once actual writing begins, write head 118 writes a preamble and sync mark, which are generated by recording channel 108, to sector 212-1. The preamble and sync marks are typically fixed patterns and are not usually encoded. After the sync mark has been written, the user data pattern is written to the user-data field of first sector 212-1 so that the user data pattern is in phase lock with the preamble and sync mark. The user data pattern, which is provided to recording channel 108 by HD controller 104 via NRZ bus 106, passes through the normal encoding path of recording channel 108 before it is written (e.g., the user data pattern undergoes encoding such as RLL encoding, error-correction encoding, or other suitable coding). At the end of the user-data field of first sector 212-1, a data pad is generated by recording channel 108 and written to the end of sector 212-1. Write mode is disabled at time $t_4$; however, writing may continue for a brief period of time until the data pad is complete (i.e., at time $t_{4a}$) as shown in close-up 604. Termination of the write mode may be planned such that the writing of the data pad is completed in time to leave inter-sector gap 204-5 between sectors 212-1 and 212-2. Note that, when jitter is present, a portion of the data pad could actually overwrite some or all of inter-sector gap 204-5. If jitter is not present, then nothing is written to inter-sector gap 204-5; however, inter-sector gap 204-5 could have a varying polarity or phase from a previous write operation (e.g., the first defect-detection pass) or have no signal at all. The effects of jitter and previous writes apply to all inter-sector gaps, not just inter-sector gap 204-5.

From times $t_5$ to $t_8$, full sector 212-2 and the first half of sector 212-3 are written in the same manner described above, without writing data to inter-sector gap 204-6. Once the first half of sector 212-3 has been written, the write mode is disabled at time $t_8$ such that nothing is written to inter-sector gap 204-2. At time $t_9$, the servo mode is enabled and a servo operation is performed to locate the next sectors for writing. The writing process described above is repeated for the remainder of sectors on the track in which section 200 resides. After the entire track has been written, the track is read back in a clockwise direction and analyzed by recording channel 108.

FIG. 7 graphically illustrates a prior-art sequence 700 for reading a user data pattern stored on the first two and one-half sectors of section 200 shown in FIG. 5. At time $t_1$, HD controller 104 enables the servo mode and performs a servo operation from times $t_1$ to $t_2$ to locate first servo field 202-1. After the servo mode is disabled, the read mode is enabled at time $t_3$. The relatively brief delay from times $t_2$ to $t_3$ corresponds to read head 120 passing over inter-sector gap 204-1 without reading the gap. Since inter-sector gap 204-1 is not read, it is also not analyzed for defects. Once the read mode is enabled, there is a lock period 208-1, as shown in close-up 702, in which recording channel 108 performs a zero-phase start, timing acquisition, and gain acquisition to lock on the preamble of sector 212-1.

Optimally, recording channel 108 would begin acquiring the lock at the beginning of the preamble. However, as shown in close-up 702 of FIG. 7, the read mode might not be enabled until after the beginning of the preamble has actually passed (i.e., read mode might be enabled at time $t_3$ as opposed to time $t_{2a}$). This relatively short delay between the beginning of the preamble and the enabling of the read mode may be introduced to ensure that recording channel 108 does not inadvertently attempt to perform the lock over inter-sector gap 204-1.

Once recording channel 108 has obtained a lock on the preamble of sector 212-1, recording channel 108 uses the sync mark to locate the beginning of the user data pattern and then begins reading and analyzing the user data pattern at time $t_{3a}$. The signal recovered from platter 124 at this time (i.e., the user data pattern) is converted from analog to digital format and a data-integrity check is performed on the recovered signal by processing the signal through the decoding path of recording channel 108 (e.g., the recovered signal undergoes error-correction, RLL decoding, and other suitable decoding). The decoding path is capable of correcting some errors in the recovered signal that may occur as a result of, for example, defects in the magnetic recording material that is coated on the face of platter 124. To create some margin for further degradation of the magnetic recording material in the field, the error-correction capabilities of the decoding path are typically reduced intentionally. If errors are present after decoding, then sector 212-1 is flagged as defective and mapped out of the final usable drive storage space. If the user data pattern is correctly recovered, then sector 212-1 is not mapped out of the final usable drive storage space. Note that, as explained above, the preamble, sync mark, and data pad are not processed through the decoding path of recording channel 108. As a result, a data-integrity check is not performed for these areas, and consequently, these areas are not analyzed during the second pass.

At time $t_4$, the reading mode is disabled, and just prior to this time, there is a close-out period 706 as shown in close-up 704 in which recording channel 108 uses the data pad to close out the reading operation. During close-out period 706, the data pad is not analyzed, and thus, this area is not checked for defects. After time $t_4$, read head 120 passes over inter-sector gap 204-5, which is not read, nor analyzed for defects, assuming that the gap has not been overwritten due to jitter. As described above, inter-sector gap 204-5 could contain data that was recorded to the gap during a previous write. However, this data typically does not effect the reading operation since the user data pattern is framed by the sync mark and data pad.

From times $t_5$ to $t_8$, full sector 212-2 and the first half of sector 212-3 are read in the same manner described above, without reading inter-sector gap 204-6. Once the first half of sector 212-3 has been read, the read mode is disabled at time $t_8$ such that inter-sector gap 204-2 is not read. At time $t_9$, the servo mode is enabled, and a servo operation is performed to locate the next sectors for reading. The reading process described above is repeated for the remainder of sectors on the track in which section 200 resides. After the entire track has been read, the writing and reading operations of the second defect-detection pass are repeated on a track-by-track basis. The second pass is completed once all tracks on platter 124 have been analyzed for defects. After the second pass, further analysis may be performed on the flagged defects to further determine whether the flagged defects warrant mapping out of the final usable disk storage space.

The two-pass defect-detection method is relatively reliable for detecting defects during manufacturing. However, performing two passes may be relatively time consuming and costly to the manufacturer. To save time and cost, some manufactures have begun to use a single-pass method for detecting defects.

In general, the prior-art single-pass defect-detection method omits the first pass of the two-pass method which is performed using the non-final formatting shown in FIG. 2, and instead performs a single pass using the subsequent formatting shown in FIG. 5. The single pass is performed by (i) writing a real user data pattern to a track of platter 124 in a manner similar to that described above in relation to FIG. 6. The track is then read back in a manner similar to that described above in relation to FIG. 7, and the user data pattern is analyzed using both data-integrity and flaw-scan techniques. This is in contrast to the second pass of the two-pass method which analyzes the user data using only data-integrity techniques.

The flaw-scan techniques used in the prior-art single-pass method may be different from those described above in relation to the first pass of the prior-art two-pass method because the prior-art single-pass method analyzes a real user data pattern as opposed to a repetitive, fixed data pattern. As described above, the flaw-scan techniques used for the first pass exploit the recording channel's knowledge of the repetitive analog signal that is recovered when the fixed data pattern is read back from disk platter 124. Thus, the prior-art single-pass method may employ different techniques, such as windowing of the mean-squared-error, windowing of the gain error, and windowing of the phase error to analyze the analog signal that is recovered when a user data pattern, having encoding such as RLL and ECC encoding, is read back from disk platter 124.

In addition to performing both data-integrity and flaw-scan techniques, the prior-art single-pass method may analyze some areas of disk platter 124 that are not analyzed during the second pass of the prior-art two-pass method. As described above, the prior-art second pass does not analyze the preamble, sync mark, and data pad of each sector, or the inter-sector gaps that separate consecutive sectors such as inter-sector gaps 204-5, 204-6, 204-7, and 204-8. To minimize these gaps in defect-detection coverage, the prior-art single-pass method may provide some limited coverage over the preamble. For example, recording channel 108 may use gain and timing lock metrics generated during lock periods 208-1, 208-2, . . . , 208-6 to analyze these areas of the preambles. The ability of recording channel 108 to analyze these lock periods, however, is generally limited to these techniques, and thus, defect detection is not as reliable during the lock periods as it would be if other flaw-scan techniques could be used.

SUMMARY OF THE INVENTION

In one embodiment, the present invention is a method for detecting defects on a surface of a hard-disk drive (HDD) platter that comprises a plurality of sectors. The method is performed by writing (i) data to two consecutive sectors that are separated by a gap and (ii) data to the gap that separates the two consecutive sectors such that, when the two consecutive sectors are sequentially read, a phase lock may be maintained between the two consecutive sectors. The two consecutive sectors and the gap are then read such that, in the absence of surface defects, a phase lock is maintained between the two consecutive sectors. The data recovered from the two consecutive sectors and the gap is analyzed to determine whether a defect exists on the surface of the HDD platter corresponding to the two consecutive sectors and the gap.

In another embodiment, the present invention is an apparatus for performing the method described above.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Figure 2:
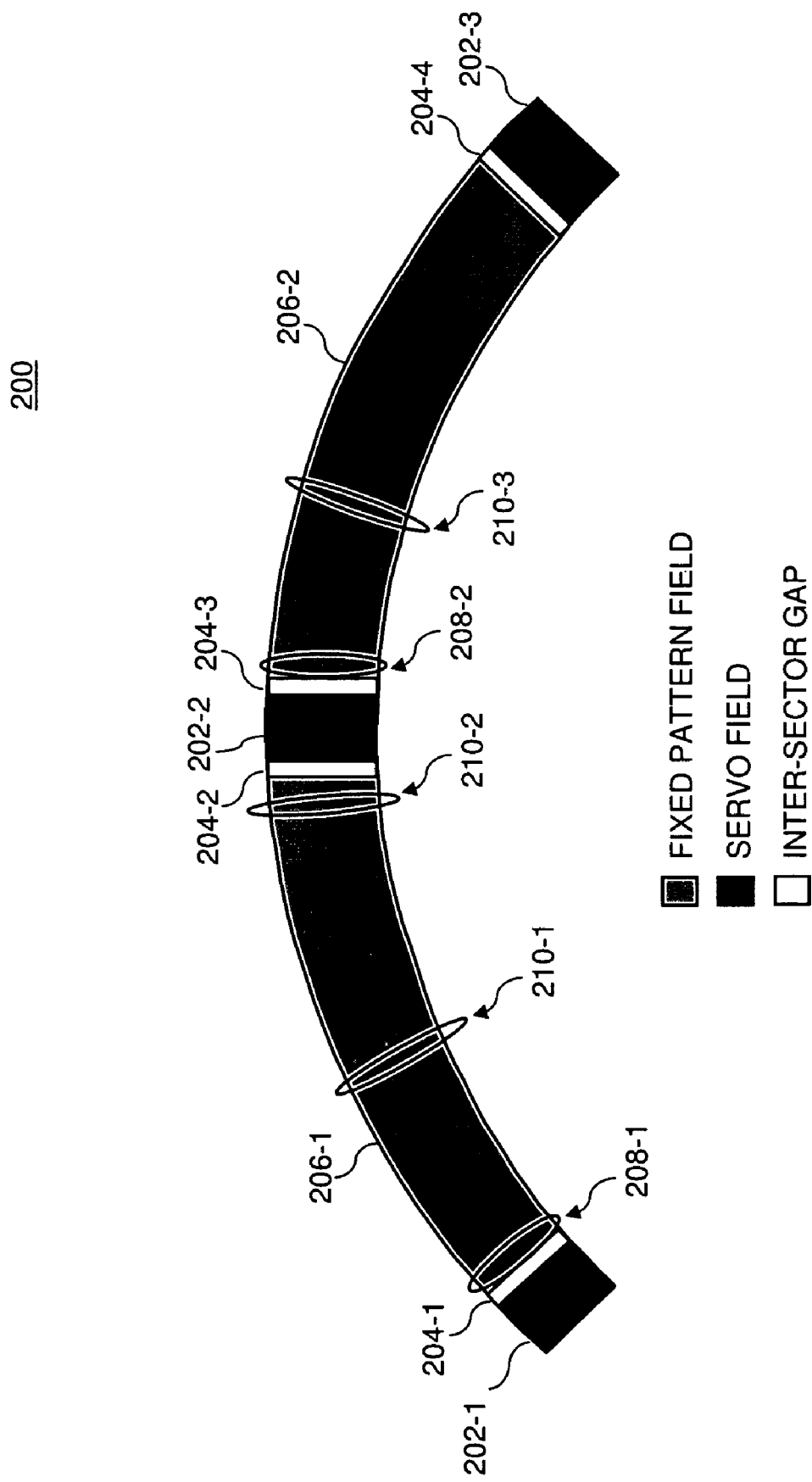
FIG. 2 shows a simplified representation of one section of a track on an HDD platter having a non-final disk formatting.
Figure 3:
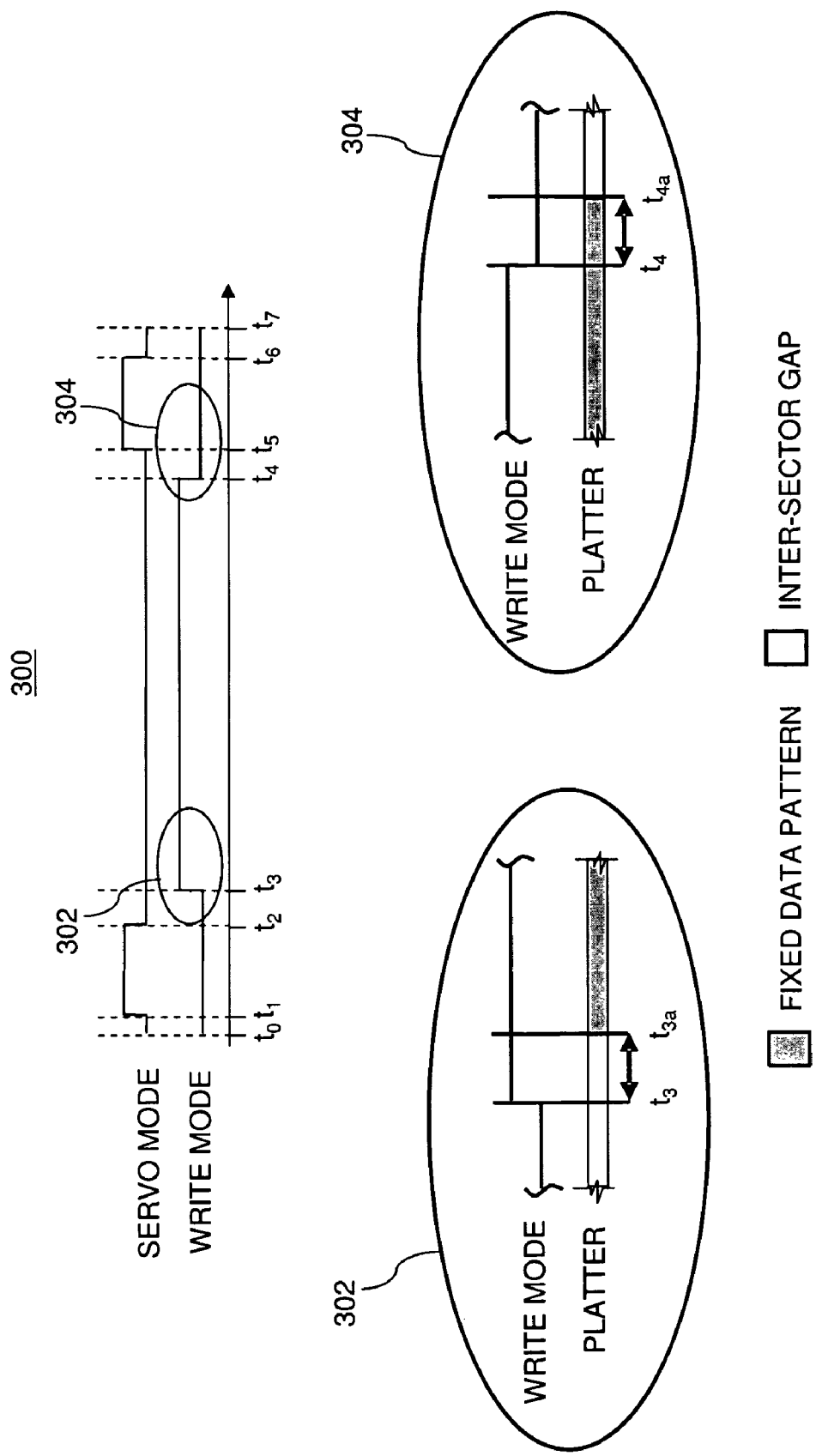
FIG. 3 graphically illustrates a prior-art sequence for writing a fixed data pattern to the first fixed-pattern field of the section shown in FIG. 2.
Figure 4:
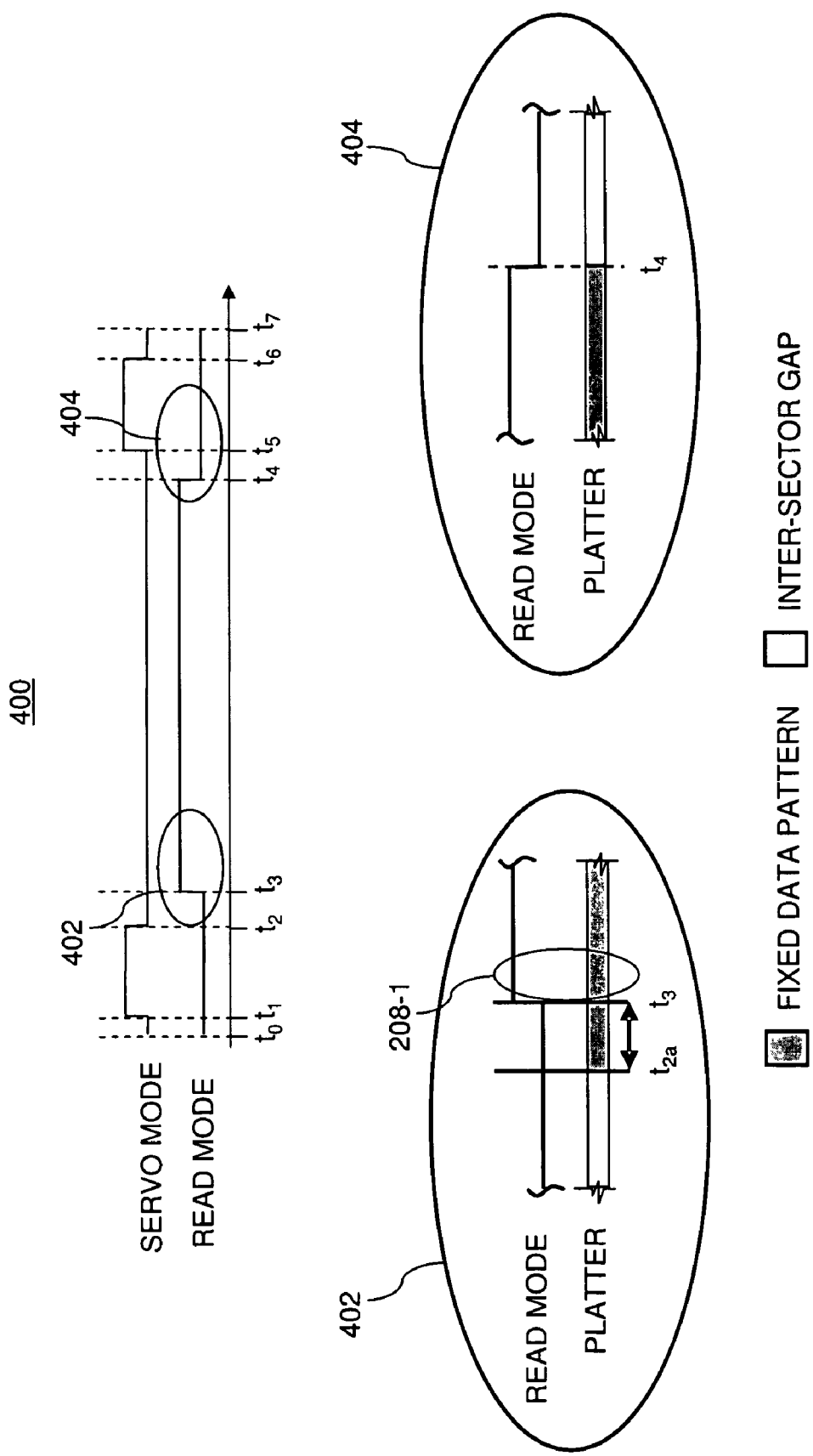
FIG. 4 graphically illustrates a prior-art sequence for reading a fixed data pattern from the first fixed-pattern field of the section shown in FIG. 2.

The prior-art single-pass defect-detection method can reduce both the time and cost that is expended during manufacturing to detect defects on the surface of a hard-disk drive (HDD) system platter. However, the time and cost savings achieved by the prior-art single-pass method come at the expense of defect-detection coverage that is inferior to that of the prior-art two-pass method. This may be seen by comparing FIGS. 2 and 5. As discussed in the background, the first pass of the prior-art two-pass defect-detection method is performed using the non-final formatting of FIG. 2. During the first pass, fixed-pattern fields 206-1 and 206-2 are fully analyzed for defects, with the exception of lock periods 208-1 and 208-2, which are covered in a limited manner. The only areas between the servo fields in section 200 that are not covered during the first pass are inter-sector gaps 204-1, 204-2, 204-3, and 204-4. The prior-art single-pass defect-detection method, on the other hand, which is performed using the subsequent formatting of FIG. 5, has many more areas in which there is no defect-detection coverage or limited defect-detection coverage. In particular, the prior-art single-pass method provides (i) no coverage or limited coverage in the areas that have no coverage or limited coverage in the first pass of the prior-art two-pass method, (ii) no coverage for inter-sector gaps 204-5, 204-6, 204-7, and 204-8, (iii) no coverage for the sync-mark fields and data-pad fields of sectors 212-1, 212-2, 212-3, 212-4, and 212-5, and (iv) no coverage or limited coverage for the preambles of sectors 212-1, 212-2, 212-3, 212-4, and 212-5.

Achieving full coverage on the areas marked no coverage or limited coverage is relatively important to ensure reliability of the HDD system. Areas such as the preamble fields, sync-mark fields, and data-pad fields are used every time that user data is written to the platter. Additionally, while inter-sector gaps are not planned for writing, as described in the background, these areas may be used at some point due to jitter or accuracy of the HD Controller 104 in the placement of the write control signaling. If these areas contain sufficiently major defects that are not mapped out of the final usable storage space, then the user may experience errors in reading and writing to the platter. In addition to mapping out unusable sectors, it is a relatively common practice amongst manufactures to not place user data near areas of the disk that are impaired, regardless of whether these areas could be used. This is often done to further ensure reliability of the HDD system. Unreliable HDD systems could result in extra costs to the manufacture due to returns or recalls of unreliable HDD systems. Further, unreliable HDD systems may damage good will of the manufacturer, resulting in customers who will no longer buy the manufacturer's HDD systems.

Figure 1:
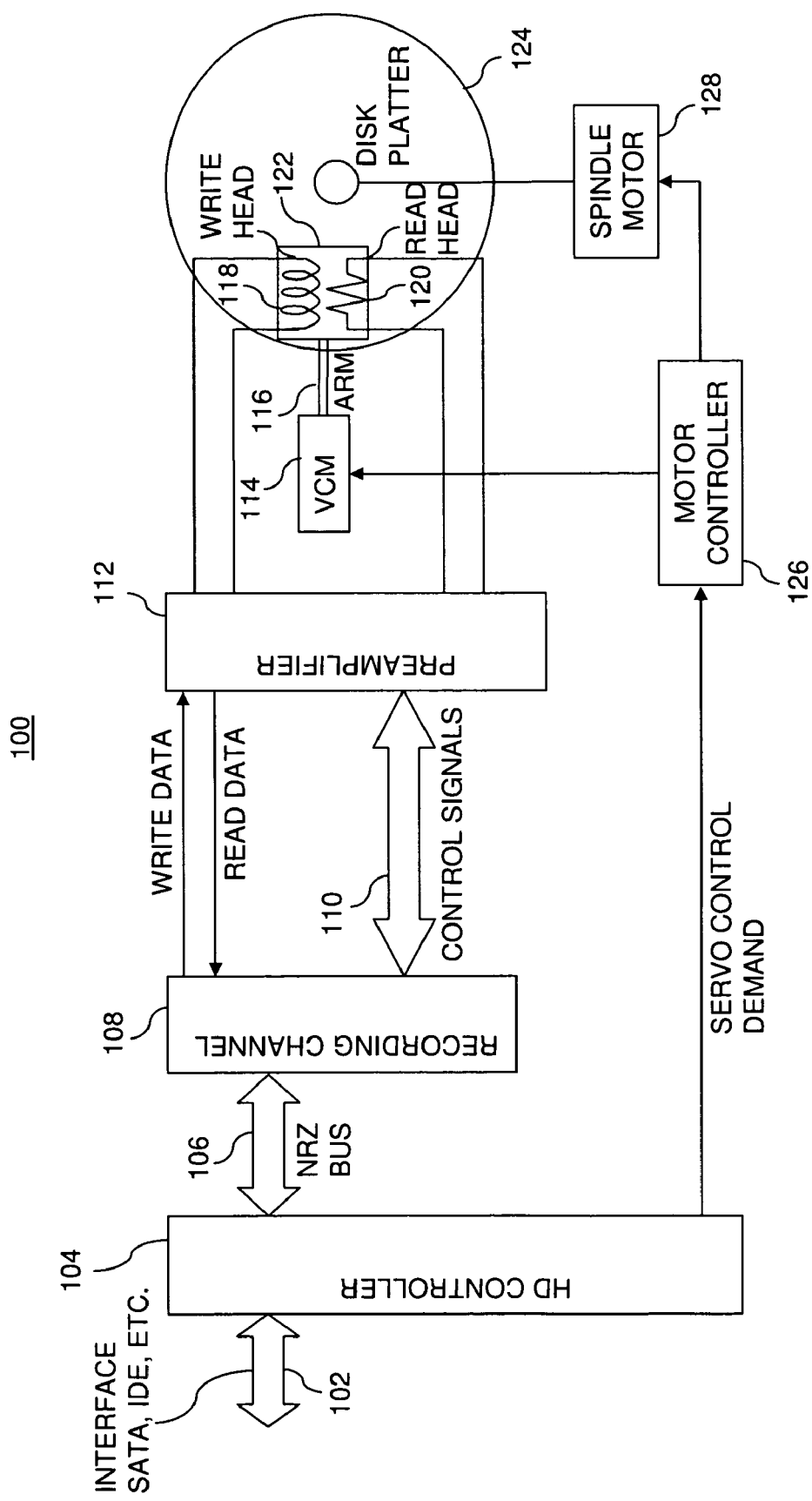
FIG. 1 shows a simplified block diagram of a conventional hard-disk drive (HDD) system.

According to various embodiments of the present invention, single-pass defect-detection methods may be envisioned that offer both (i) the time and cost savings of the prior-art single-pass method and (ii) defect-detection coverage that is the same, or substantially the same, as the first pass of the prior-art two-pass method. These methods may be implemented in an HDD system that may be represented using a block diagram analogous to FIG. 1. However, recording channels used in the present invention may differ from recording channel 108 of prior-art HDD system 100 in a few ways. For example, recording channels of the present invention may support internal writing and reading modes that are scheduled by the recording channel itself during the single-pass defect detection, in addition to the normal writing and reading modes of recording channel 108 that are scheduled by HD controller 104. These internal writing and reading modes and some other differences between prior-art recording channel 108 and recording channels of the present invention are described in further detail below.

Figure 5:
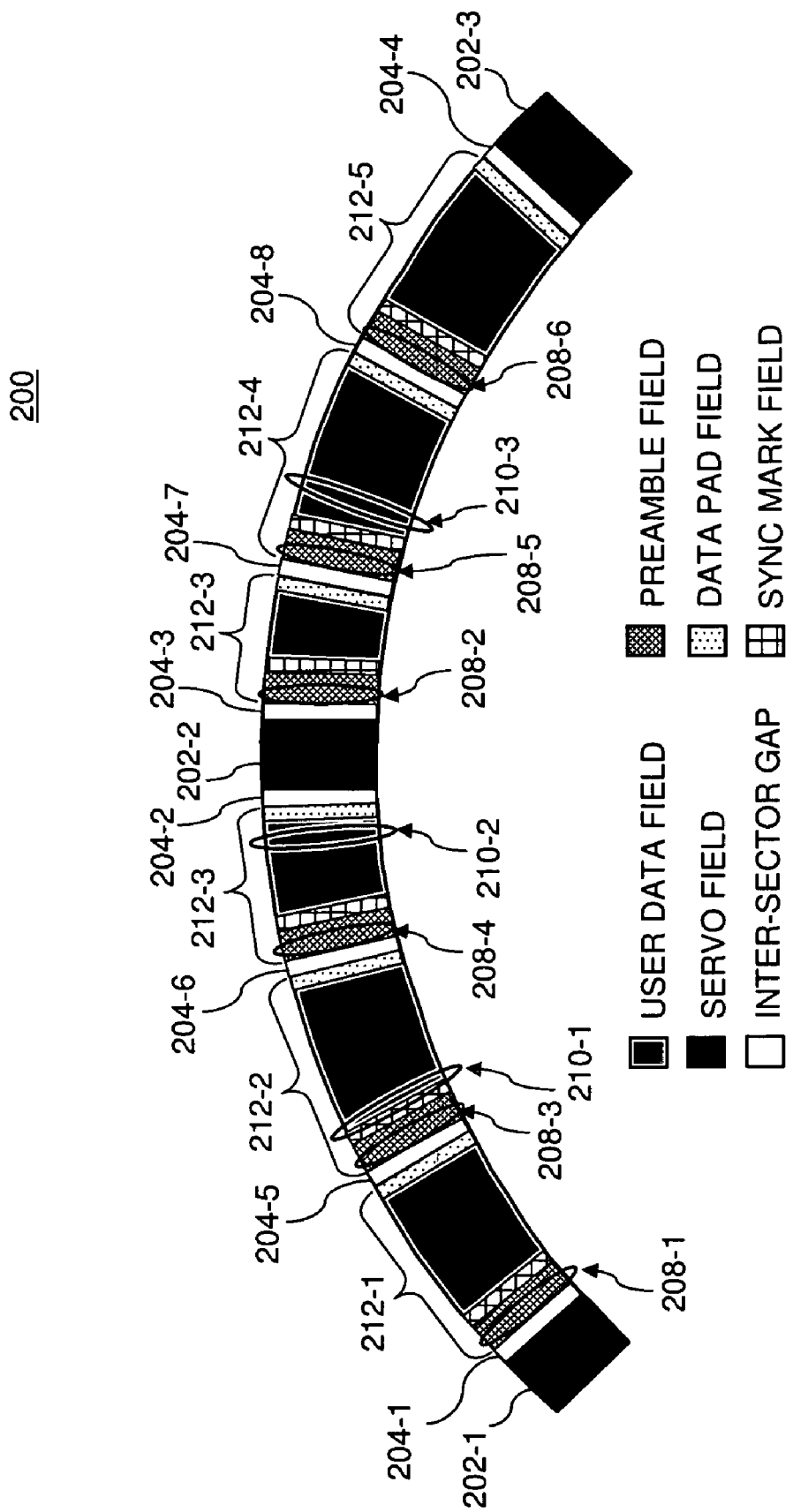
FIG. 5 shows a simplified representation of a subsequent disk formatting on the same section of track shown in FIG. 2.

Similar to the prior-art single-pass method, the present invention may be performed using the subsequent formatting shown for section 200 in FIG. 5. In general, the present invention may be performed by writing (i) a user data pattern, or alternatively, a pseudorandom data pattern, and (ii) a fixed data pattern to a track of the HD drive platter. The user or pseudorandom data pattern is written to each sector of the track in a manner similar to that of the prior-art single-pass method (i.e., using encoding and attaching a preamble, sync mark, and data pad). The fixed data pattern is written to the inter-sector gaps that separate consecutive sectors, such that, for each set of two consecutive sectors, the first sector in the set is in phase lock with the second sector in the set. For purposes of this application, two consecutive sectors are sectors that are physically adjacent to one another, separated by an inter-sector gap, and located within the same track. Further, two consecutive sectors may be said to be in phase lock with one another when the data written to the inter-sector gap between the two sectors enables a recording channel to maintain a phase lock when reading the consecutive sectors sequentially from one sector to the next.

After the track has been written, the track is read back and analyzed. In so doing, the recording channel takes advantage of the fact that consecutive sectors are in phase lock with one another by reading consecutive sectors sequentially without stopping. Two consecutive sectors may be said to be read sequentially when reading continues from the end of one sector, through the inter-sector gap separating the consecutive sectors, to the beginning of the next sector. The preambles, sync marks, data pads, and inter-sector gaps are analyzed using suitable flaw-scan techniques. The user (or pseudorandom) data patterns are analyzed using both data-integrity checks and suitable flaw-scan techniques. This process is repeated for all tracks on the disk, and the single-pass defect detection is completed when all tracks have been analyzed. To further understand the single-pass defect-detection methods of the present invention, consider FIGS. 8-10.

Figure 6:
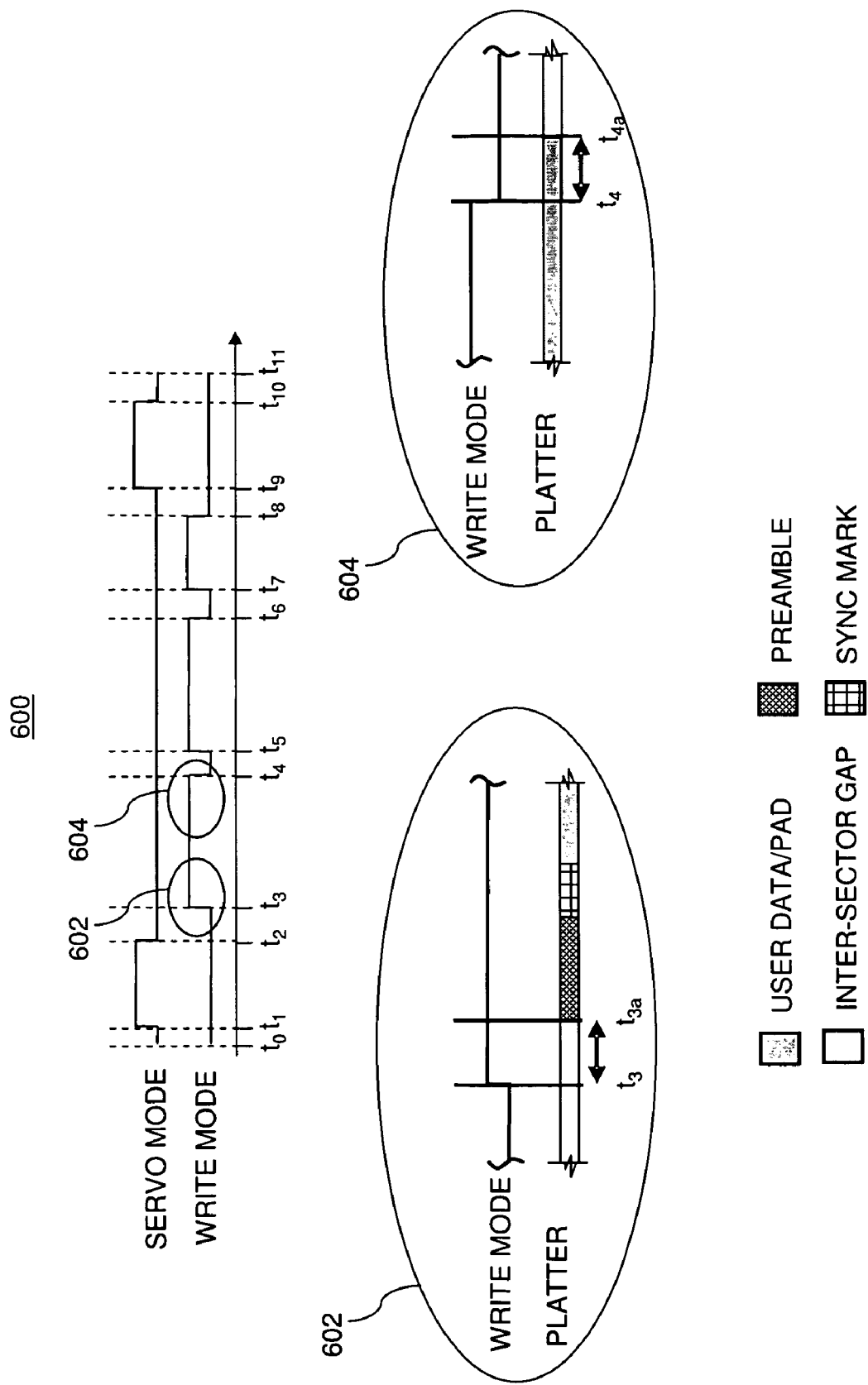
FIG. 6 graphically illustrates a prior-art sequence for writing a user data pattern to the first two and one-half sectors of the section shown in FIG. 5.
Figure 8:
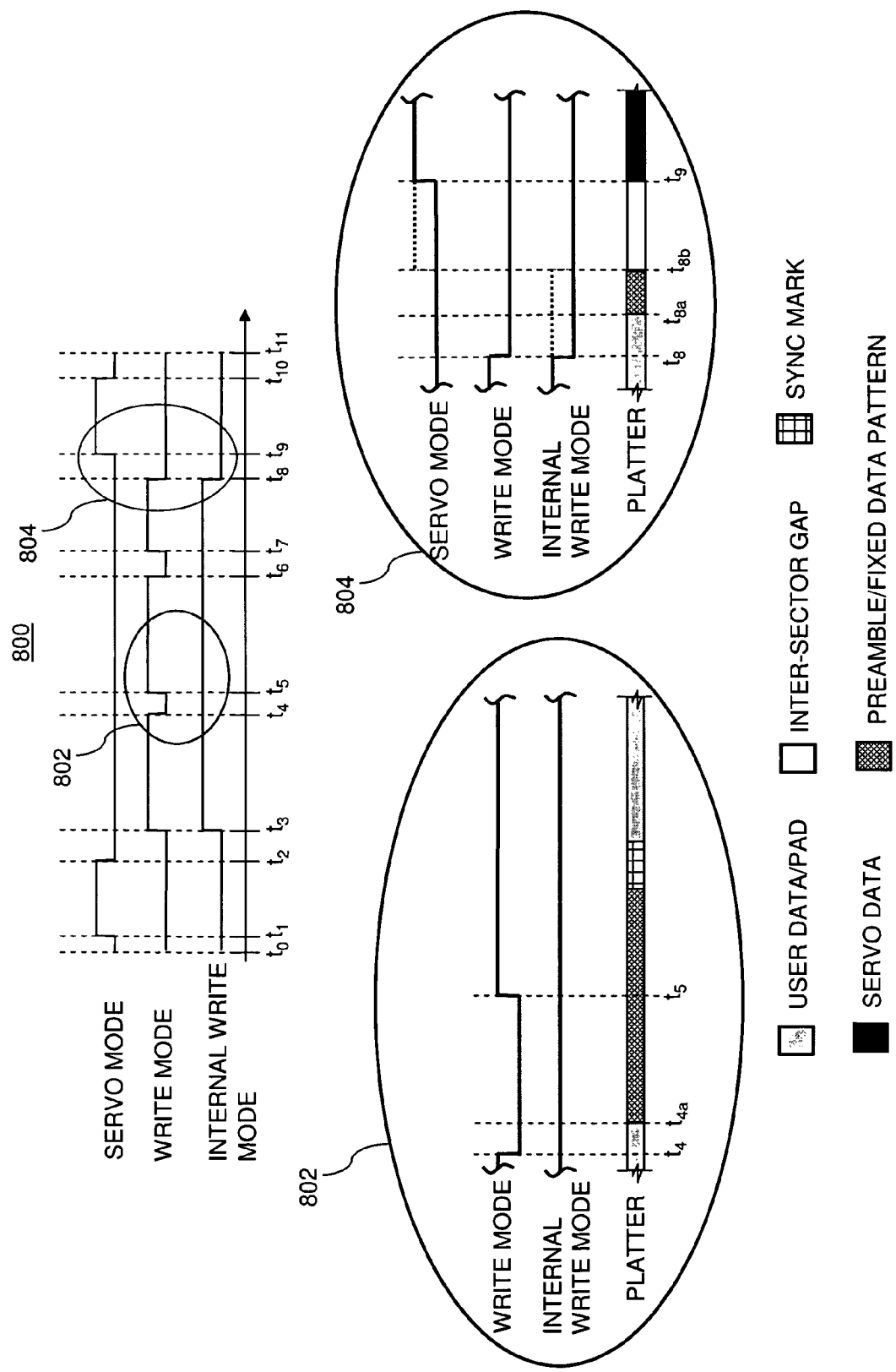
FIG. 8 graphically illustrates a sequence for writing data to the first two and one-half sectors of the section shown in FIG. 5 according to one embodiment of the present invention.

FIG. 8 graphically illustrates a sequence 800 for writing data to the first two and one-half sectors of section 200 shown in FIG. 5 according to one embodiment of the present invention. From times to $t_3$, writing sequence 800 is the same as that described above in relation to times to $t_3$ of prior-art writing sequence 600 of FIG. 6 (i.e., a servo operation is performed and nothing is written to inter-sector gap 204-1). At time $t_3$, the recording channel enables (i) the normal write mode that is scheduled by the HD controller and (ii) an internal write mode that is scheduled by the recording channel itself. The normal write mode is the same write mode that is enabled in the prior-art single-pass method and that is used by the consumer during normal write operations. The internal write mode, which is specific to this invention, may be scheduled by the recording channel to correspond to the enabling of the normal write mode.

From times $t_3$ to $t_4$, the preamble, sync mark, user or pseudorandom data pattern, and data pad are written to sector 212-1 of FIG. 5. The preamble, sync mark, and data pad are generated and supplied by the recording channel in a manner similar to that of the prior-art single-pass method. The user or pseudorandom data pattern may be supplied by the HD controller via an NRZ bus, or the pseudorandom data pattern may be generated and provided by the recording channel itself. Before being written to the HD platter, the user or pseudorandom data pattern is processed through the recording channel's encoding path (e.g., the user or pseudorandom data pattern undergoes encoding such as RLL encoding, error-correction encoding, or other suitable coding). When writing begins, there may be a relatively brief delay for the preamplifier to power up, as described above in relation to close-up 602 of FIG. 6, and this delay may be timed such that the preamplifier begins writing the preamble as soon as inter-sector gap 204-1 has passed.

At time $t_4$, the normal write mode is disabled; however, the internal write mode remains enabled. As shown in close-up 802, writing of the data pad and possibly the user or pseudorandom data pattern may continue for a brief period of time after time $t_4$ until the data pad is complete (i.e., until time $t_{4a}$). After the data pad is written, the internal write mode of the recording channel causes a fixed data pattern to be written immediately over inter-sector gap 204-5 so that writing is continuous from the data pad of sector 212-1 to the preamble of sector 212-2. The fixed data pattern, which may be the same pattern as that used for the preamble and may be a repetitive pattern such as the 2T pattern described in the background, is written such that sectors 212-1 and 212-2 are in phase lock with one another. At time $t_5$, the normal write mode is enabled, and the recording channel generates the preamble for sector 212-2 so that there is no disruption between the fixed data pattern and the preamble.

Sector 212-2 and the first half of sector 212-3 (note that the second half of sector 212-3 is located after servo field 202-2) are written in a manner similar to that of sector 212-1, and inter-sector gap 204-6 is overwritten with the fixed data pattern in a manner similar to that of inter-sector gap 204-5. Note that, all data between inter-sector gaps 204-1 and 204-2 will typically be in phase lock with one another. At time $t_8$, the normal write mode, and possibly the internal write mode, is disabled. As shown in close-up 804, there may be a relatively brief period after the normal write mode is disabled at time $t_8$ in which the data pad and possibly the user or pseudorandom data for the first half of sector 212-3 continue to be written (i.e., until time $t_{8a}$).

It is preferable that the internal write mode ends before the write head reaches servo field 202-2 to prevent the servo data in this field from being overwritten. The recording channel may employ several different methods to determine when to terminate the internal write mode. For example, the recording channel could terminate the internal write mode as soon as the servo mode is enabled at time $t_9$. As a precaution, the servo mode could be enabled early at time $t_{8b}$ as suggested by the dashed lines on the servo mode timing diagram in close-up 804. As another example, the recording channel could terminate the internal write mode at or after the last write event (e.g., the first half of sector 212-3 in FIG. 5) has occurred. The recording channel could identify the last sector by making a comparison with the servo-address-mark-to-servo-address-mark (SAM2SAM) counter. The SAM2SAM counter is locked to the Servo Address Mark so that it may be used to predict when the next servo will happen. For example, the SAM2SAM counter value may be compared to a programmable value that would be indicative of when the servo operation would start. This method may also employ a configurable register that allows a manufacturer to specify a number of fixed-data-pattern bits to write after the last write event. In so doing, the internal write mode may be extended past the last write mode as suggested by the dashed lines on the internal write mode timing diagram in close-up 804. This register can be set to zero when the manufacturer desires no additional data to be written after the last write event. As yet another example, both methods above could be used together such that the internal write mode may be terminated upon the earlier of (i) the first indication of the servo mode, and (ii) the first indication of the end of the last write event.

After the internal write mode is terminated, the servo mode is enabled at time $t_9$, and a servo operation is performed to locate the next sectors for writing. The writing process described above is repeated for the remainder of sectors on the track in which section 200 resides. After the entire track has been written, the track is read back in a clockwise direction and analyzed by the recording channel.

Figure 9:
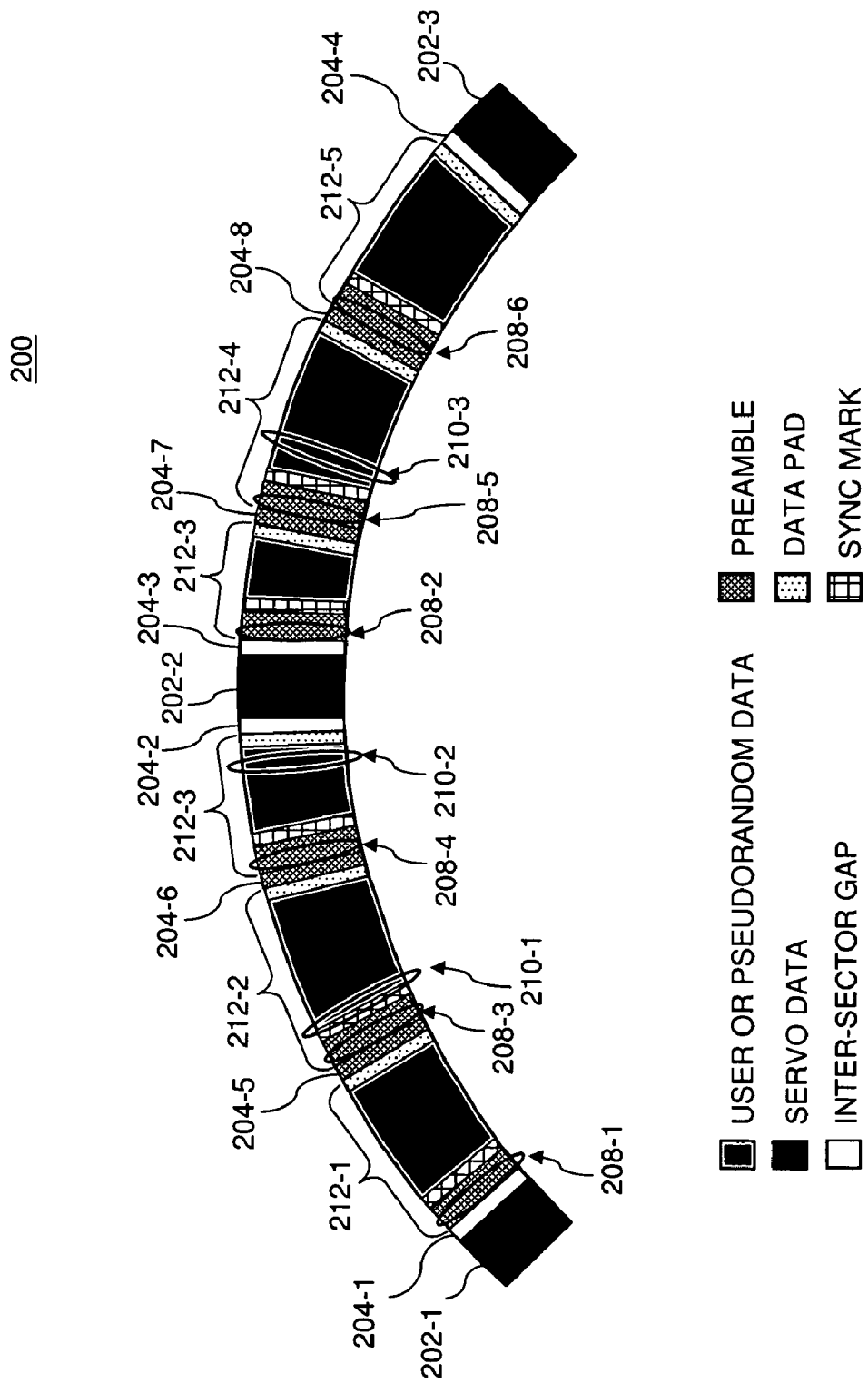
FIG. 9 shows a simplified representation of the section shown in FIG. 5 that has been overwritten with data using the writing sequence of FIG. 8.

FIG. 9 shows a simplified representation of section 200 shown in FIG. 5 that has been overwritten with data using writing sequence 800 of FIG. 8. The fields in FIG. 9 represent actual information that is written to section 200. This is in contrast to FIG. 5, which illustrates the formatting of section 200 and not actual information written to the disk. As shown in FIG. 9, a preamble, a sync mark, user or pseudorandom data, and a data pad are written to each sector and to each partial sector. Further, the areas reserved for inter-sector gaps 204-5, 204-6, 204-7, and 204-8 are overwritten with the fixed data pattern (or preamble) such that there are no gaps between consecutive sectors.

Figure 7:
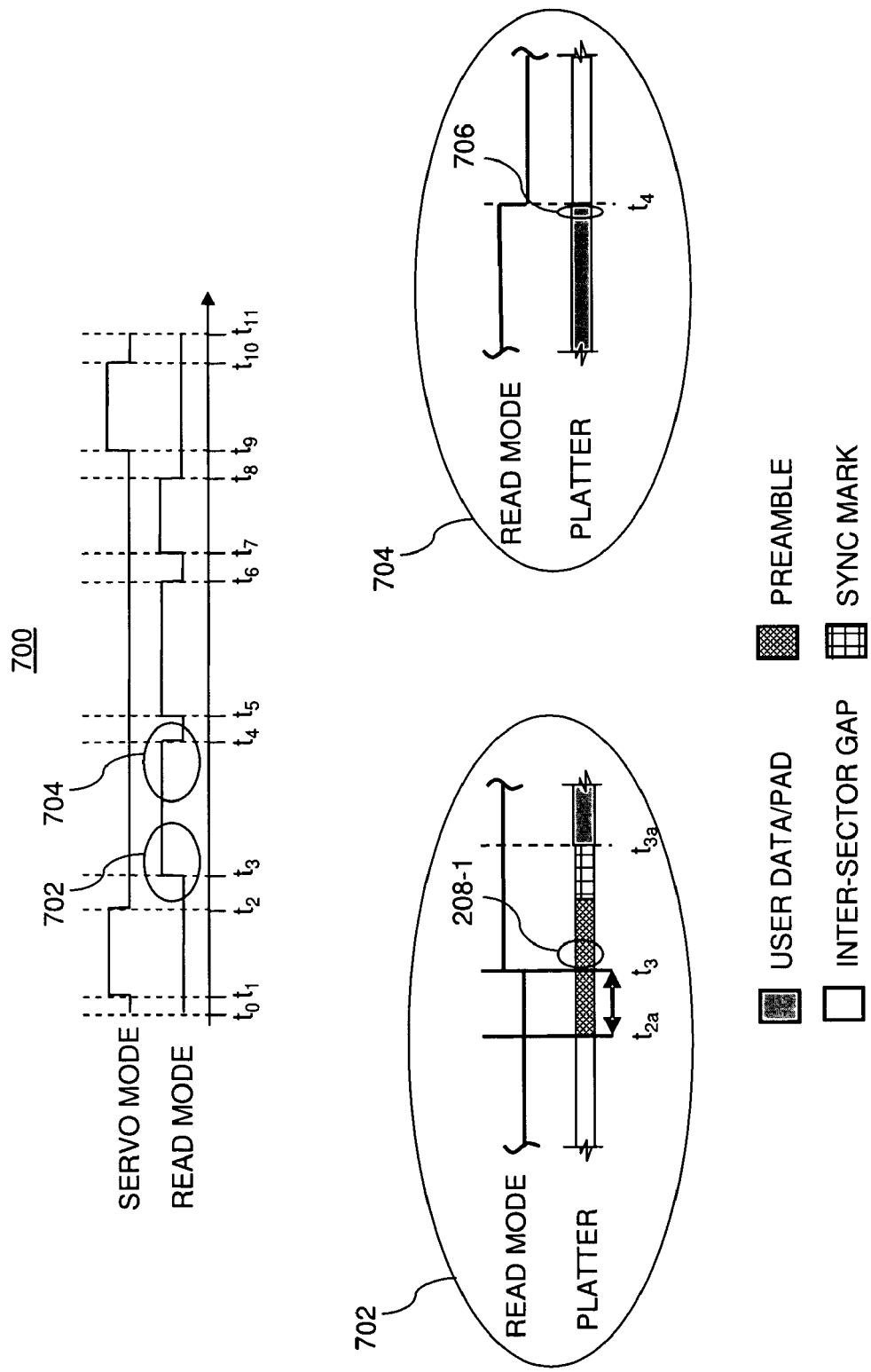
FIG. 7 graphically illustrates a prior-art sequence for reading a user data pattern stored on the two and one-half sectors of the section shown in FIG. 5.
Figure 10:
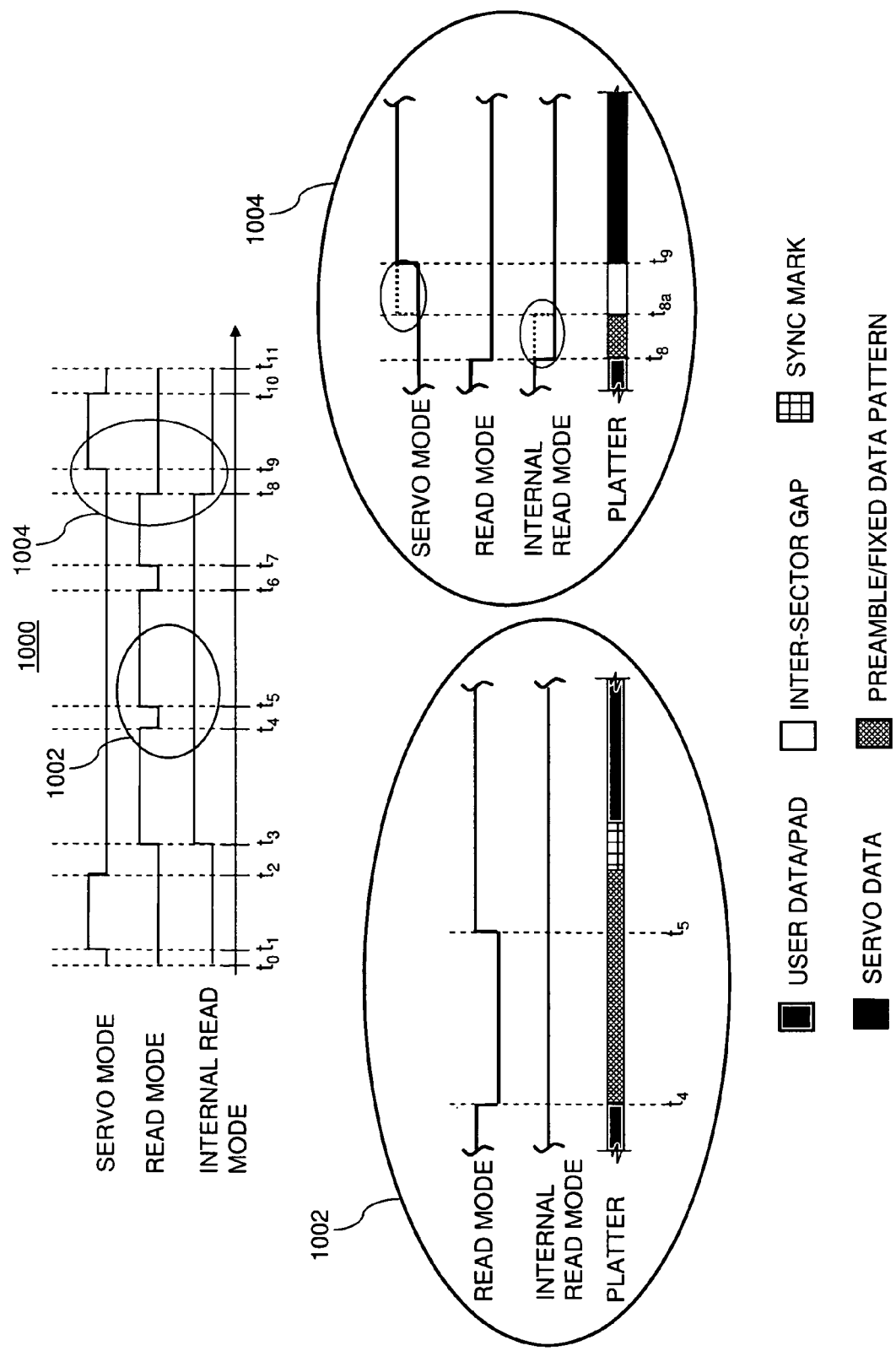
FIG. 10 graphically illustrates a sequence for reading data stored on the two and one-half sectors of the section shown in FIG. 9 according to one embodiment of the present invention.

FIG. 10 graphically illustrates a sequence 1000 for reading data stored on the first two and one-half sectors of section 200 shown in FIG. 9 according to one embodiment of the present invention. From times to $t_3$, reading sequence 1000 of FIG. 10 is the same as that described above in relation to times $t_0$ to $t_3$ of the prior-art writing sequence 700 of FIG. 7 (i.e., a servo operation is performed, and nothing is read from inter-sector gap 204-1). At time $t_3$, the recording channel enables (i) the normal read mode that is scheduled by the HD controller and (ii) an internal read mode that is scheduled by the recording channel itself. The normal read mode is the same read mode that is enabled in the prior-art single-pass method and that is used by the consumer during normal read operations. The internal read mode, which is specific to this invention, may be scheduled by the recording channel to correspond to the enabling of the normal read mode.

From times $t_3$ to $t_4$, the preamble, sync mark, user or pseudorandom data pattern, and data pad are read from sector 212-1 of FIG. 5 and analyzed. The preamble, sync mark, and data pad, which are not encoded, do not pass through the recording channel's decoding path (e.g., the recovered signals in these areas do not undergo error-correction, RLL decoding, and possibly other suitable decoding). Instead, the preamble, sync mark, and data pad are analyzed using the traditional flaw-scan techniques described in the background that may be used to analyze repetitive, fixed patterns. This is in contrast to the prior-art single-pass method, which typically provides no coverage or limited coverage in these areas. Note that, at the beginning of the preamble for sector 212-1, there is still a lock period 208-1 and defect-detection capabilities in this area may still be limited.

The user or pseudorandom data pattern is analyzed using both flaw-scan and data-integrity checking techniques. To perform the flaw scan, the signal recovered from the disk platter is analyzed by the recording channel before it is decoded, using different techniques, such as windowing of the mean-squared-error, windowing of the gain error, windowing of the phase error, or other suitable flaw-scan techniques for analyzing a user or pseudorandom data pattern that is encoded. The data-integrity check is performed by processing the user or pseudorandom data pattern through the recording channel's decoder path. To create some margin for further degradation of the magnetic recording material in the field, the error-correction capabilities of the decoding path are typically reduced intentionally. If a portion of the user or pseudorandom data pattern cannot be properly decoded, then the area is flagged as defective and mapped out of the final usable drive storage space. In the case of a pseudorandom data pattern that was generated by the recording channel, the recording channel may compare the decoded pseudorandom data pattern against the expected decoded pseudorandom data pattern. If the user or pseudorandom data pattern was supplied by the HD controller, then the HD controller may perform the comparison.

The recording channel may signal the location of defects to the HD controller using a number of different methods that may vary depending on where the defects are physically located. For example, flags that are generated as a result of defects located in the user-data fields may be provided to the HD controller via the NRZ data bus at the same time that the portion of user data corresponding to the defect is provided to the HD controller. In other words, the flag may be real-time aligned with the data signaled to the HD controller. Flags that are generated as a result of defects located outside of the user-data fields (i.e., within the preambles, sync marks, data pads, and inter-sector gaps) may be provided to the HD controller via the NRZ data bus at the same time that the first symbol of user data in the corresponding sector is returned to the controller. These flags might not be real-time aligned with the data signaled to the HD controller because the preambles, sync marks, data pads, and inter-sector gap contents are not provided to most HD controllers. Note that other methods of signaling the locations of defects to the HD controller may be employed, especially if the HD controller is capable of processing preambles, sync marks, data pads, and inter-sector gap contents.

Referring back to FIG. 10, after the data pad of sector 212-1 is read and analyzed, the normal read mode is disabled at time $t_4$; however, the internal read mode remains enabled. The internal read mode causes the recording channel to continue reading and analyzing the platter without stopping. As shown in close-up 1002, from times $t_4$ to $t_5$, the recording channel reads the fixed data pattern that occupies the space of inter-sector gap 204-5. The signal recovered from inter-sector gap 204-5 is then analyzed using traditional flaw-scan techniques. During this time period, the recording channel's timing and gain loops may be set to the post-acquire mode of processing.

At time $t_5$, the normal read mode is enabled, and the recording channel continues to read the platter. Since the fixed data pattern in inter-sector gap 204-5 and the preamble of sector 212-2 are in phase lock with one another, reading may typically continue without stopping. At the beginning of the preamble of sector 212-2, the recording channel may perform a zero-phase-start (ZPS) calculation. The ZPS calculation is not applied immediately, but rather is compared to a threshold. If the ZPS calculation is less than the threshold, then the fixed data pattern in inter-sector gap 204-5 and the preamble of sector 212-2 are in phase lock with one another and reading continues. In this case, no lock period is required in which the defect-detection capabilities of the recording channel might be limited. If the ZPS calculation is greater than the threshold, then the ZPS calculation is applied, and sector 212-2 is processed as if it were the first sector between servo fields (i.e., a lock is performed). In this case, the lock may have been lost, for example, due to a defect near the end of sector 212-1.

Sector 212-2 and the first half of sector 212-3 are read and analyzed in a manner similar to that of sector 212-1, and inter-sector gap 204-6 is read and analyzed in a manner similar to that of inter-sector gap 204-5. In so doing, the entire area between inter-sector gaps 204-1 and 204-2 may be continuously read and analyzed without stopping. At time $t_8$, the normal read mode, and possibly the internal read mode, is disabled. It is preferable that the internal read mode ends before servo field 202-2 to prevent the recording channel from confusing servo data for the data written between servo fields 202-1 and 202-2. The recording channel may employ several different methods to determine when to terminate the internal read mode. For example, the recording channel could terminate the internal read mode as soon as the servo mode is enabled at time $t_9$. As a precaution, the servo mode could be enabled early at time $t_{8b}$ as suggested by the dashed lines on the servo mode timing diagram in close-up 1004. As another example, the recording channel could terminate the internal read mode at or after the last read event has occurred (e.g., after the first half of sector 212-3 has been read). The recording channel could identify the last sector by making a comparison with the SAM2SAM counter in a manner similar to that described above. As described above, the SAM2SAM counter performs a modulo operation every time that a SAM is encountered. This comparison may be set up to indicate the last read event before the servo mode is enabled. This method may also employ a configurable register that allows a manufacturer to specify a number of fixed-data-pattern bits to read after the last read event. In so doing, the internal read mode may be extended past the last normal read mode as suggested by the dashed lines on the internal read mode timing diagram in close-up 1004. Typically, this reading extension would correspond to the number of extra bits written to the platter after the internal write mode was disabled. This register can be set to zero when the manufacturer desires no additional data to be read after the last write event. As yet another example, both methods above could be used together such that the internal read mode may be terminated upon the earlier of (i) the first indication of the servo mode and (ii) the first indication of the end of the last write event.

After the internal read mode is terminated, the servo mode is enabled at time $t_9$, and a servo operation is performed to locate the next sectors for reading. The reading and analyzing operations described above are repeated for the remainder of sectors on the track in which section 200 resides. After the entire track has been read and analyzed, the single-pass write and read operations of the present invention are repeated for the remaining tracks on the platter.

The present invention may provide defect-detection coverage that is substantially similar to that of the first pass of the prior-art two-pass method. For example, in FIG. 9, a first area between inter-sector gaps 204-1 and 204-2 and a second area between inter-sector gaps 204-3 and 204-4 are fully analyzed for defects with the exception of lock periods 208-1 and 208-2, which are covered in a limited manner. There are no breaks in coverage in these first and second areas, which are substantially equal in size to fixed-pattern fields 206-1 and 206-2 of FIG. 2. Similar to the first pass of the prior-art two-pass method, the only areas between the servo fields in section 200 that are not covered by the present invention are inter-sector gaps 204-1, 204-2, 204-3, and 204-4. By providing the same coverage as the prior-art two-pass method with only one pass, the present invention may ensure the same reliability as the prior-art two-pass method, while reducing the overall manufacturing time and costs for performing defect detection.

Compared to the prior-art single-pass method, the present invention may provide more defect-detection coverage. As described at the beginning of the detailed description, the prior-art single-pass method provides (i) no coverage or limited coverage in the areas that have no coverage or limited coverage in the first pass of the prior-art two-pass method (i.e., inter-sector gaps 204-1, 204-2, 204-3, and 204-4 and lock periods 208-1 and 208-2), (ii) no coverage for inter-sector gaps 204-5, 204-6, 204-7, and 204-8, (iii) no coverage for the sync-mark fields and data-pad fields of sectors 212-1, 212-2, 212-3, 212-4, and 212-5, and (iv) no coverage or limited coverage for the preambles of sectors 212-1, 212-2, 212-3, 212-4, and 212-5. The present invention provides full defect-detection coverage in all of the areas that the prior-art single-pass method does not, with the exception of those areas mentioned in item (i). By providing this additional coverage, the present invention may improve reliability over the prior-art single-pass method, while maintaining the same or substantially similar manufacturing times and costs.

While the present invention was described in terms of writing data to a track and then reading and analyzing the data from the track before proceeding to the next track, the present invention is not so limited. Alternative embodiments of the present invention may be envisioned in which data is written to two or more tracks before any of the tracks are read back. Then, the two or more tracks may be read back before any further writing takes place. Other possible writing and reading sequences are possible within the scope of this invention including analyzing fewer than all of the tracks or sectors on a platter.

Even though the present invention was described in terms of performing a single pass, the present invention may be used in conjunction with one or more other passes. For example, the present invention may be used as a second pass that is performed after the first pass of the prior-art two-pass method is performed. As another example, after the single pass of the present invention is performed, a subsequent pass may be performed to further evaluate the areas of the platter that were flagged as defective to determine whether these areas truly warrant being mapping out of the final usable storage space.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

We claim:

1. A method for detecting defects on a surface of a hard-disk drive (HDD) platter that comprises a plurality of sectors, the method comprising:
   (a) writing data to two consecutive sectors separated by a gap;
   (b) writing data to the gap such that, when the two consecutive sectors are sequentially read, phase lock is maintained between the two consecutive sectors;
   (c) reading the two consecutive sectors and the gap such that, in the absence of surface defects, phase lock is maintained between the two consecutive sectors; and
   (d) analyzing the data from the two consecutive sectors to determine whether a defect exists on the surface of the HDD platter corresponding to the two consecutive sectors.

2. The method of claim 1, wherein step (d) further comprises analyzing the data from the gap to determine whether a defect exists on the surface of the HDD platter corresponding to the gap.

3. The method of claim 1, wherein, in step (d), the two consecutive sectors are analyzed using one or more flawscan techniques.

4. The method of claim 1, wherein the data written to each of the two consecutive sectors comprises a preamble, a sync mark, user/pseudorandom data, and a data pad.

5. The method of claim 4, wherein the user/pseudorandom data is analyzed using one or more data integrity checking techniques.

6. The method of claim 5, wherein:
   step (d) further comprises analyzing the data from the gap to determine whether a defect exists on the surface of the HDD platter corresponding to the gap; and
   the two consecutive sectors and the gap are analyzed using one or more flawscan techniques.

7. The method of claim 5, wherein:
   the user/pseudorandom data is encoded using one or more error correction coding techniques to generate encoded user/pseudorandom data that is written to the two consecutive sectors; and
   the one or more data integrity checking techniques comprise decoding the encoded user/pseudorandom data using one or more error correction techniques to determine whether the user/pseudorandom data may be recovered without errors.

8. The method of claim 1, wherein the data written to the gap is a fixed, repetitive data pattern.

9. The method of claim 1, wherein step (c) comprises:
   (c1) generating a zero phase start calculation after a read head has passed over the gap;
   (c2) comparing the zero phase start calculation to a threshold;
   (c3) determining whether the phase lock has been lost based on the comparison; and
   (c4) acquiring a new phase lock if the phase lock has been lost.

10. The method of claim 1, wherein the two consecutive sectors and the gap form at least part of a track of the HDD platter, and steps (a)-(d) are repeated for all parts of all tracks on the HDD platter.

11. The method of claim 1, wherein:
   steps (a)-(d) are performed using a HDD system having a normal write mode and an internal write mode;

in step (a), the normal write mode is enabled in the HDD system to write the data to the two consecutive sectors; and in step (b), the internal write mode is enabled in the HDD system to write the data to the gap.

12. The method of claim 1, wherein:

steps (a)-(d) are performed using a HDD system having a normal read mode and an internal read mode; and in step (c):
the normal read mode is enabled in the HDD system to read the data from the two consecutive sectors; and
the internal read mode is enabled in the HDD system to read the data from the gap.

13. An apparatus for detecting defects on a surface of a hard-disk drive (HDD) platter that comprises a plurality of sectors, the apparatus comprising a recording channel adapted to:

provide data to a write head for writing to two consecutive sectors separated by a gap;

provide data to the write head for writing to the gap such that, when the two consecutive sectors are sequentially read, phase lock is maintained between the two consecutive sectors;

maintain, upon reading of the two consecutive sectors and the gap by a read head, a phase lock, in the absence of surface defects, between the two consecutive sectors; and analyze the data from the two consecutive sectors to determine whether a defect exists on the surface of the HDD platter corresponding to the two consecutive sectors.

14. The method of claim 13, wherein the recording channel is further adapted to analyze the data from the gap to determine whether a defect exists on the surface of the HDD platter corresponding to the gap.

15. The method of claim 13, wherein the apparatus is an integrated circuit.

16. The apparatus of claim 13, wherein the apparatus comprises the write head and the read head.

17. The apparatus of claim 13, wherein the two consecutive sectors are analyzed using one or more flawscan techniques.

18. The apparatus of claim 13, wherein the data written to each of the two consecutive sectors comprises a preamble, a sync mark, user/pseudorandom data, and a data pad.

19. The apparatus of claim 18, wherein the user/pseudorandom data is analyzed using one or more data integrity checking techniques.

20. The apparatus of claim 19, wherein:
the recording channel is further adapted to analyze the data from the gap to determine whether a defect exists on the surface of the HDD platter corresponding to the gap; and
the two consecutive sectors and the gap are analyzed using one or more flawscan techniques.

21. The apparatus of claim 19, wherein:
the user/pseudorandom data is encoded using one or more error correction coding techniques to generate encoded user/pseudorandom data that is written to the two consecutive sectors; and
the one or more data integrity checking techniques comprise decoding the encoded user/pseudorandom data using one or more error correction techniques to determine whether the user/pseudorandom data may be recovered without errors.

22. The apparatus of claim 13, wherein the data written to the gap is a fixed, repetitive data pattern.

* * * * *

UNITED STATES PATENT AND TRADEMARK OFFICE
CERTIFICATE OF CORRECTION

| | | |
|---|---|---|
| PATENT NO. | : 7,817,363 B2 | Page 1 of 1 |
| APPLICATION NO. | : 12/272255 | |
| DATED | : October 19, 2010 | |
| INVENTOR(S) | : Keenan T. O'Brien and Richard Rauschmayer | |

It is certified that error appears in the above-identified patent and that said Letters Patent is hereby corrected as shown below:

In Column 19, Line 31, the phrase "The method of ..." should read -- The apparatus of --.

In Column 20, Line 1, the phrase "The method of ..." should read -- The apparatus of --.

Signed and Sealed this
Twenty-second Day of February, 2011

David J. Kappos
*Director of the United States Patent and Trademark Office*